UNITED STATES PATENT OFFICE.

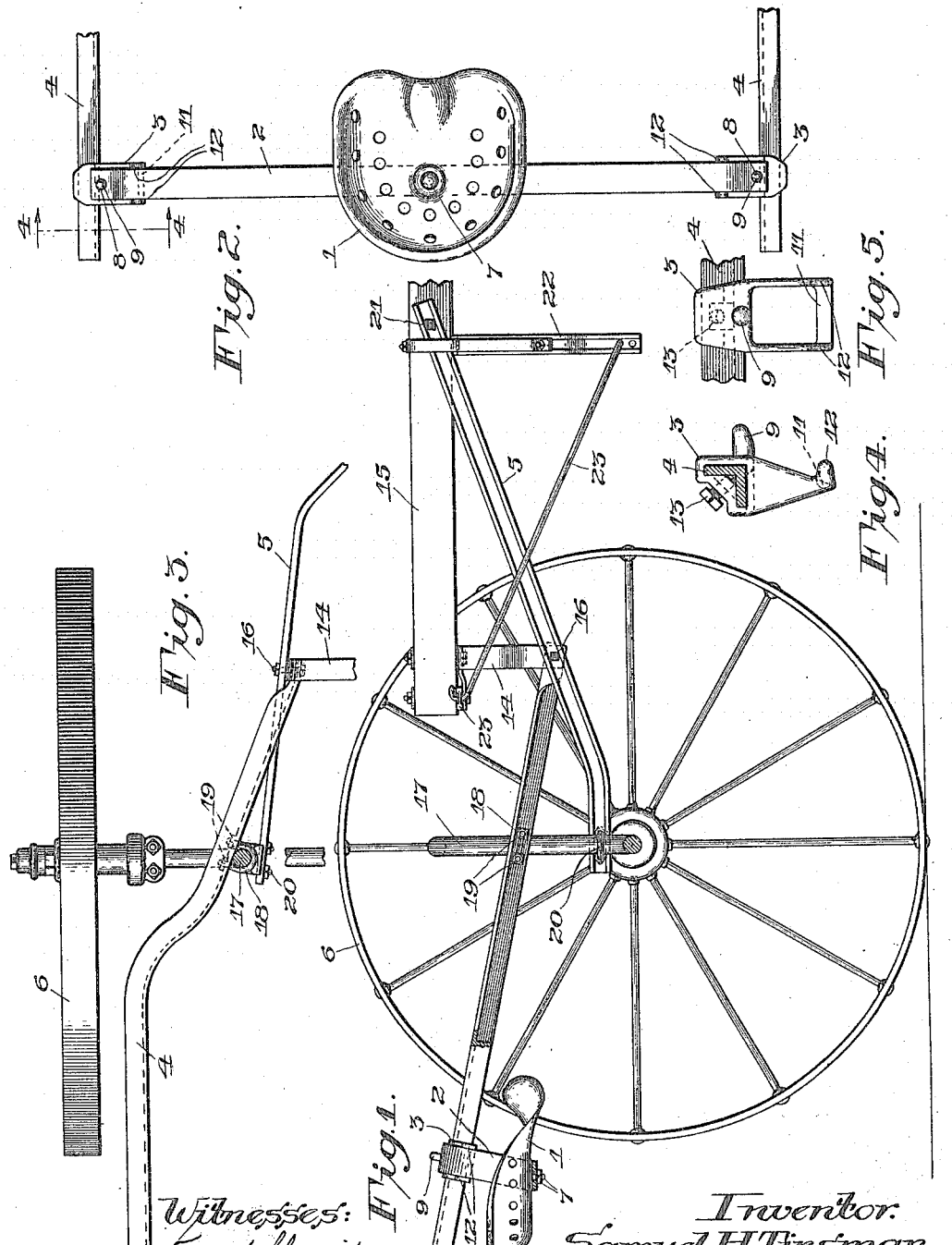

SAMUEL H. TINSMAN, OF MORRIS, ILLINOIS, ASSIGNOR, BY MESNE ASSIGNMENTS, TO INTERNATIONAL HARVESTER CORPORATION, A CORPORATION OF NEW JERSEY.

VEHICLE-SEAT.

1,187,941.  Specification of Letters Patent.  Patented June 20, 1916.

Application filed March 5, 1913. Serial No. 752,172.

*To all whom it may concern:*

Be it known that I, SAMUEL H. TINSMAN, a citizen of the United States, residing at Morris, in the county of Grundy and State of Illinois, have invented certain new and useful Improvements in Vehicle-Seats, of which the following is a full, clear, and exact specification.

My invention relates to vehicle seats.

It has for its object to improve and simplify the construction of vehicle seats in such a manner as to render them especially adapted to use in connection with vehicles of the type used for agricultural purposes.

Further objects of my invention are to support the seat in such a manner as to distribute the weight in the desired portions with respect to the vehicle and to adjust the same with respect to the vehicle in an improved manner.

I obtain these objects by providing an improved seat carried in an improved manner upon improved coöperating supporting means.

In order that my invention may be clearly and fully disclosed, I have illustrated in the accompanying drawings one embodiment which the same may assume in practice. In this embodiment my invention is shown adapted for use with a riding cultivator. It is to be understood, however, that it may be used in other relations.

Figure 1 is a transverse sectional view of the cultivator with the seat attached thereto and one wheel removed; Fig. 2 is a top plan view of the seat and the supporting members therefor; Fig. 3 is a detail view showing one of the seat supporting members and the supporting frame; Fig. 4 is a sectional view on the line 4—4 of Fig. 2; Fig. 5 is a top plan view of one of the seat supporting brackets.

The construction shown herein, when broadly considered, comprises a seat 1 carried by a transversely extending resilient band 2 removably secured to a pair of adjustable brackets 3 carried on a pair of rearwardly protruding supporting members 4 adjustably attached to a vehicle frame 5, which is itself carried upon a pair of transport wheels 6.

The seat proper may be of any desired type, such for instance as the type usually used upon cultivators or mowers. This seat 1 is removably attached to the band 2 substantially midway between the ends thereof by means of a nut and bolt connection 7. The band 2 is shown to be slightly bowed between its ends and formed of a flat resilient metal strip. At its ends this band is preferably provided with means enabling the same to be readily attached to or disconnected from the supports 4. In the construction illustrated, I have shown the band 2 to be provided with holes or perforations 8 in the ends thereof which are adapted to fit over upwardly extending lugs or projections 9 on the brackets 3. As shown, these brackets 3 are preferably formed in one piece or casting and are each provided with a recessed portion 11 conforming substantially to the shape of the end of the strip 2 and adapted to receive and underlie the same to form a substantial support therefor which removes strain from the lug or projection 9 (located at one end of this recess 11 and substantially over the support 4). On the opposite sides of the members 3 and at their free ends, lugs or ears 12 are provided which serve to prevent the lateral displacement of the band 2. As shown in Fig. 4, these brackets 3 are adapted to be slipped over the ends of the supports 4 and are adjustably attached thereto by means of screws 13 on the under side of the same.

The supports 4 are preferably formed of angle iron or steel and are normally disposed at an angle with respect to the horizontal. As shown in Fig. 3, the rear end of each of these members 4 preferably extends substantially parallel with the wheels 6 and is formed integral with an inwardly extending portion disposed at an angle thereto but in the same horizontal plane therewith. The converging inner ends of these supports 4 are attached at their ends to a substantially U-shaped depending brace 14 fixed to the under side of the vehicle pole 15 at a point adjacent the inner end of the latter. As shown herein, the inner ends of the members 4 are flattened and fixed by a single bolt 16 to the depending ends of the brace member 14 and to the frame 5 at a point intermediate the connections of the latter to the pole or tongue 15 and a pair of vertically extending standards 17 carried by the wheel axle. The members 4 are each adjustably attached to one of these members 17 by means of a U-bolt 18 and nuts 19 on the outer ends thereof, so that the members 4 are independently adjustable in a vertical direction and the seat 1 may be adjusted relatively to the member 17 into any desired position, suitable clearances being provided where the ends of the bolt 18 extend through the members 4.

The frame members 5 are shown to be attached to the bases of the standards 17 and to protrude upward and forward therefrom toward the vehicle pole. The rear ends of the members 5 may be attached to the standards 17 by any suitable means, as for instance by U-bolts 20 spaced from the sides of the standards, which permit relative endwise movement of the supporting members, and their front ends may be attached to the pole by any suitable means, as by a bolt 21. As in the usual construction, any suitable draft connections 22 may be suspended from the inner end of the pole 15 and these draft connections may be provided with any suitable equalizer connection 23. These specific details however form no part of my present invention.

When an operator is seated in the seat 1, the weight is evenly distributed, the operator being located at one side of the pivot and the supports 4 being fixed intermediate their ends to the standards 17 and at their inner ends to the frame and connected through it to the pole 15. Thus the operator's weight serves to balance the pole and take the weight of the same from the necks of the horses. To accommodate drivers of different weights, the brackets 3 may be adjusted longitudinally of the supports whenever desired or be readily adjusted vertically by simply adjusting the U-bolts 18. It is also apparent that since the supports 4 are independently adjustable, the seat may be readily adjusted to the desired position while working on a hill-side, or the like. By the provision of the resilient band 2 the operator is afforded a comfortable seat, and the jars incident to the passage of the truck over rough ground are absorbed. Further, by making the band removable from its supports, the latter may be readily removed whenever desired by simply lifting the band to disengage one or both ends of the same from the lugs 9. Obviously, the operator is thus enabled to take his seat very readily without it being necessary to straddle the supports for the same. It is further to be noted that by locating the seat at the back of the frame upon supports protruding therefrom, the operator is permitted free use of his limbs, as for instance, in depressing or otherwise operating the cultivator shovels or other devices carried by the truck and that increased freedom of movement is permitted these shovels or devices in a lateral direction.

While I have described in this application one embodiment which my invention may assume in practice, it is of course to be understood the form shown herein is susceptible to modification without departing from its spirit.

What I claim as new and desire to secure by Letters Patent is:

1. In combination, an arched wheel carrying axle, a frame on the axle, a pair of vertically adjustable seat supporting bars pivoted to the frame at their forward ends and secured intermediately to the vertical portions of the axle, and a hammock seat between the rear ends of the bars.

2. In combination, an arched axle, a frame thereon, a pole attached to the frame, and a pair of seat supporting bars pivoted to said frame forwardly of the axle and extending rearwardly and secured intermediately to the outer sides of the vertical portions of the axle in a manner to permit vertical adjustment thereon.

3. In combination, a wheeled frame, rearwardly extending seat supporting bars spaced apart and secured to the frame, a transverse seat carrying strap extending between the rear ends of said bars, a pin thereon, said bars fitted in an opening in said strap, and means for engaging the strap to prevent swinging thereof.

4. In combination, a wheeled frame, rearwardly extending seat supporting bars spaced apart and secured to the frame, brackets adjustably mounted on the rear ends of the bars, each of said brackets having an upwardly extending lug, a pair of spaced ears, and a seat carrying member extending between said supporting bars engaging with the upwardly extending lugs on the brackets and lying between the spaced ears to prevent swinging thereof about the upwardly extending lugs.

In testimony whereof I affix my signature, in the presence of two witnesses.

SAMUEL H. TINSMAN.

Witnesses:
F. W. HOFFMEISTER,
H. L. ROCKWELL.

Copies of this patent may be obtained for five cents each, by addressing the "Commissioner of Patents, Washington, D. C."